3 Sheets--Sheet 1.
M. P. SMITH.
Improvement in Apple-Corers.
No. 131,126.           Patented Sep. 3, 1872.
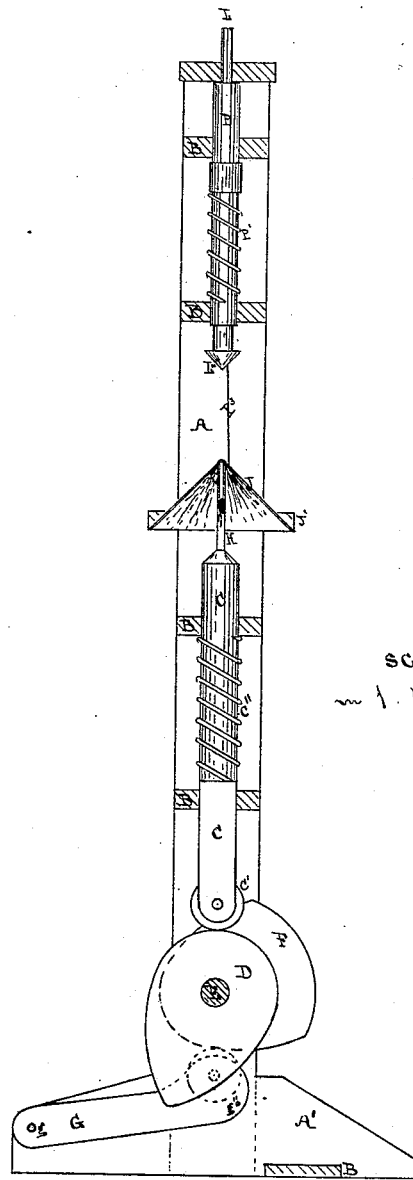
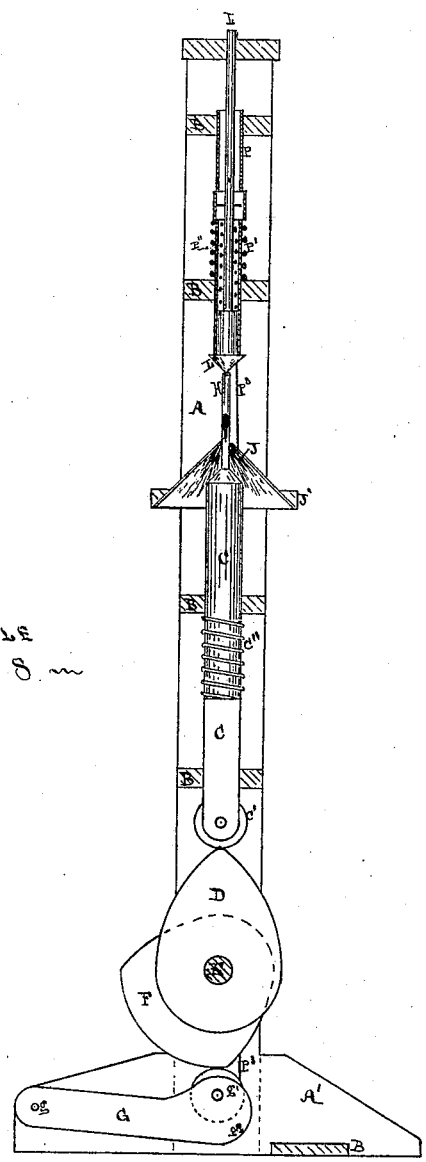
Witnesses.
Jas. W. Kirkman
Wm. Woolford
Inventor.
Marshall P. Smith

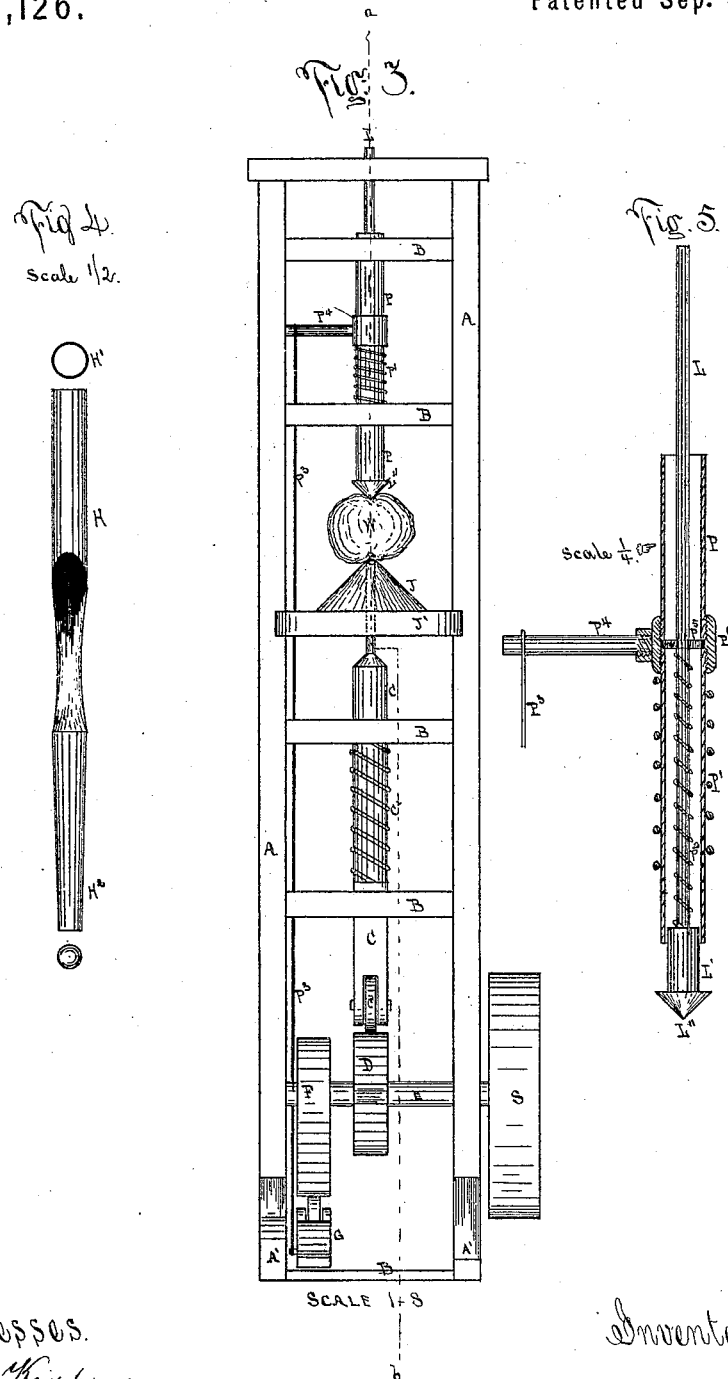

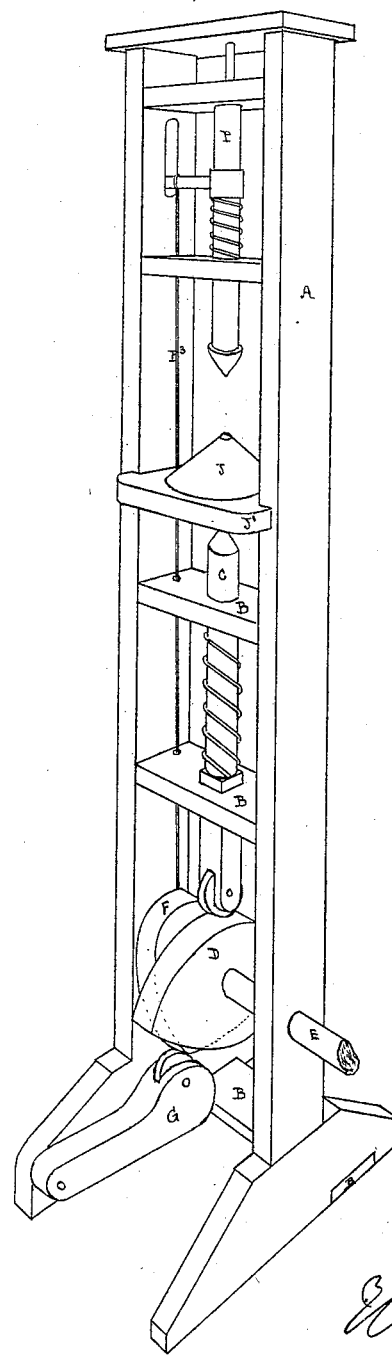

UNITED STATES PATENT OFFICE.

MARSHALL P. SMITH, OF BALTIMORE, MARYLAND.

IMPROVEMENT IN APPLE-CORERS.

Specification forming part of Letters Patent No. 131,126, dated September 3, 1872.

Specification describing certain Improvements in Apple-Coring Machines, invented by MARSHALL P. SMITH, of Baltimore, in the county of Baltimore and State of Maryland.

The object of this invention is to provide a rapid and economical method of removing the cores from apples without unnecessary waste of the edible portion thereof.

The operation of coring of apples presents two mechanical difficulties: First, the core is harder than the flesh, and the cutting-knife as ordinarily used is apt to spring off and cut too large a piece from the apple; and, second, the core does not always run through the center of the apple, and unless great care is exercised there is danger that a part of the core may be left in the apple and the edible flesh removed instead thereof.

The first of these difficulties is avoided or removed in this machine by using a tubular punch or cutter, H, which varies in size from one-half to three-fourths inch in diameter, according to the description of apple to be cored. The second, by means of the two cones J and L″, (for, no matter how eccentrically a core may run through an apple, its two extremities are always marked by the stem and flower depressions,) and by placing one depression upon the cone J and bringing the other cone, L″, down into the other depression, the apple will be held rigidly while the cutter H pierces it from end to end.

In the drawing hereunto annexed, Figure 1 represents a vertical section through the line $a\ b$, showing the machine at rest before the cams have begun to act or just after an apple has been cored and released. Fig. 2 represents the same section, showing the machine at the moment when the two cams D and F are at their full throw and the apple has been pierced. Fig. 3 represents a front elevation, showing the machine at the moment when the cam F has reached its full throw, bringing down the cone L″ and holding the apple firmly, and just before the cam D has begun to raise the plunger C. Fig. 4 represents the cutting-tool H in perspective, one-half full size. Fig. 5 represents the upper plunger P in detail, and drawn to scale of one-fourth full size. Fig. 6 is a perspective view of the machine in same position as drawn in Fig. 3. Figs. 1, 2, 3, and 6 are drawn to scale of one-eighth.

A A are the uprights of the frame of the machine, which may be made of wood. It stands upon cross-pieces or feet A′, by which it is fastened to the floor. In the drawing, these uprights are five inches wide and one and one-half inch thick, and they are held together by the cross-pieces B B, which also serve as guides or journals for the upper and lower plungers C and P. C is a plunger running through the center of the cross-pieces B B, the lower portion being square to keep it from turning, the upper portion being round to accommodate the strong spiral spring C″, which spring, bearing upon the cross-piece B above and the square shoulder of the plunger below, serves to keep the said plunger C continually under downward pressure, with the friction-roller C′ always bearing upon the cam D. In the upper end of this plunger C is inserted the tubular punch or cutter H. The cam D is shaped as drawn to scale in Figs. 1 and 2, and has a throw of about four inches. The cam F is also shaped as drawn to scale, and has a throw of about three and a half inches. This cam bears upon friction-roller $g'$ in lever G. At the point $g''$ is fastened a small iron rod, $P^3$, which passes upward through the cross-pieces B B, and is fastened above to the arm $P^4$ of the upper plunger P. When this cam, therefore, depresses the lever G the plunger P descends. These cams are placed upon the shaft E, which receives motion from pulley S. J is a hollow cone, preferably of galvanized metal or heavy tin, which rests upon the shelf J′ and covers the cutter H. When at rest, the top of the cutter H projects above the apex of this cone about one-eighth of an inch. This cone serves as a guide, upon which to place one depression of the apple, thus centering one end of the core, and being hollow it permits the cores to drop away as they are cut, one after another.

The construction of the upper plunger P is shown in detail in Fig. 5. It is is formed of two pieces of inch or inch and-a-quarter gas-pipe, coupled together by the T-joint $P^6$, and where the ends meet is inserted a washer, $P^5$. From this T projects the gas-pipe arm $P^4$. Inside of this outer pipe P is the inner plunger-rod L, which I prefer to make of hard wood. On the lower end of this rod is the cone L″, immediately above which the rod is turned a scant inch or inch and a quarter diameter, as shown at L', to fit loosely the pipe P. Above this the rod is five-eighths round. The cone serves to center the other end of the core. This rod passes up through the hole in the washer P$^5$, continuing up through a hole in the top of the machine. Around this rod is a light spiral spring, P$^2$, one end of which bears on the shoulder L' and the other on the washer P$^5$, and above the washer is a pin which prevents this rod from descending further than shown in the drawing. This form of construction is adopted to accommodate the throw of the plunger to the varying size of the apple. The motion of the inner rod is about two inches, and, when at the greatest downward throw of the plunger, the apex of the upper cone will be about two inches from the apex of the lower cone. If the upper plunger were rigid, therefore, only apples of two inches diameter could be cored; but this spring permits apples of any size up to four inches diameter to be cored with the greatest facility. The distance of this throw can be varied at any time by lengthening or shortening the rod P$^3$. Outside of this pipe P is the heavy spiral spring P$^1$, which, bearing upon the T above and the cross-piece B below, serves to keep the plunger always raised, except when depressed by the cam F.

Having now described the construction of this machine, its operation is explained in a few words. The machine being in motion, the operator places the apple upon the apex of the cone J at the moment when the machine is at rest, in the position shown in Fig. 1, and holds it there for a moment until the plunger P, actuated by the cam F, descends, and the cone L'' catches the apple, as shown in Fig. 3. He then releases his hold and picks up another apple. Meanwhile the cutter H rises, cuts the core, and descends.

An examination of the form of the cams will show that the cam F reaches its full throw before the cam D commences to act, and holds the lever G down until the cam D has reached its full throw, when both cams cease to act simultaneously.

An experienced hand can work this machine at sixty to seventy-five revolutions per minute, and as a barrel contains on an average three hundred to three hundred and fifty apples it will core a barrel in five minutes, or twelve barrels per hour.

Having now described my invention, what I claim is—

1. The apple-coring machine, composed of the frame A B, the plungers C and P, the cams D and F, the cones J and L'', and the cutter H, constructed and operating substantially in the manner and for the purposes as described.

2. The upper and lower cones L'' and J, or their equivalents, when used in combination with the reciprocating cutter H, for the purpose of coring apples.

MARSHALL P. SMITH.

Witnesses:
 JAS. W. KIRKMAN,
 WM. W. WOOLFORD.